United States Patent
Serkh et al.

(10) Patent No.: US 6,612,408 B2
(45) Date of Patent: Sep. 2, 2003

(54) FRICTIONAL DAMPING STRUT

(75) Inventors: Alexander Serkh, Troy, MI (US); Andrzej Dec, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/954,993

(22) Filed: Sep. 17, 2001

(65) Prior Publication Data
US 2003/0051956 A1 Mar. 20, 2003

(51) Int. Cl.[7] .................................................. B60T 7/12
(52) U.S. Cl. ........................................ 188/129; 267/201
(58) Field of Search ............................. 188/129, 82.8, 188/322.22, 134, 136, 166; 267/196, 201, 205; 474/133

(56) References Cited

U.S. PATENT DOCUMENTS

| | | | | |
|---|---|---|---|---|
| 2,237,318 A | | 4/1941 | Snyder | 188/129 |
| 2,429,140 A | | 10/1947 | Snyder | 267/9 |
| 2,481,006 A | * | 9/1949 | Dath | 188/129 |
| 2,507,760 A | | 5/1950 | Dath | 188/129 |
| 2,646,860 A | * | 7/1953 | Pirard | 188/129 |
| 3,698,259 A | * | 10/1972 | Reeves | 188/129 |
| 3,866,724 A | | 2/1975 | Hollnagel | 188/129 |
| 3,870,128 A | * | 3/1975 | Nicolay et al. | 188/112 R |
| 3,952,845 A | * | 4/1976 | Asquith | 188/196 D |
| 4,606,442 A | | 8/1986 | Paton et al. | 188/381 |
| 4,738,437 A | | 4/1988 | Paton et al. | 267/196 |
| 4,886,255 A | * | 12/1989 | Paton | 267/197 |
| 5,133,435 A | | 7/1992 | Taylor | 188/381 |
| 5,174,551 A | * | 12/1992 | Mintgen | 188/129 |
| 5,369,952 A | | 12/1994 | Walters | 60/39.31 |
| 5,595,268 A | * | 1/1997 | Paton | 188/129 |
| 5,946,946 A | * | 9/1999 | Sharp et al. | 188/129 |
| 5,951,423 A | | 9/1999 | Simpson | 474/109 |
| 6,247,687 B1 | * | 6/2001 | Jensen et al. | 188/129 |
| 6,386,528 B1 | * | 5/2002 | Thorn et al. | 188/129 |

FOREIGN PATENT DOCUMENTS

| | | | | |
|---|---|---|---|---|
| DE | 4203449 | 12/1993 | | F02B/67/06 |
| WO | 01/79727 A2 | 10/2001 | | F16H/7/08 |

* cited by examiner

Primary Examiner—Jack Lavinder
Assistant Examiner—Xuan Lan Nguyen
(74) Attorney, Agent, or Firm—J. A. Thurnau, Esq.; C. H. Castleman, Esq.; S. G. Austin, Esq.

(57) ABSTRACT

The invention comprises a frictional damping strut. The strut comprises an inner cylinder that slides within an outer casing. A spring biases the inner cylinder away from the outer casing in an axial direction. A first wedge member cooperatively engages a second wedge member. The first wedge member having a frictional engagement with the inner cylinder such that when the inner cylinder is pressed into the outer casing the first wedge member bears upon the second wedge member causing the first wedge member to radially expand, thereby increasing a frictional force between the first wedge member and the inner cylinder. A second spring preloads the first wedge member against the second wedge member. A belt tensioner may incorporate the damping strut to preload a belt and damp belt oscillations.

7 Claims, 3 Drawing Sheets

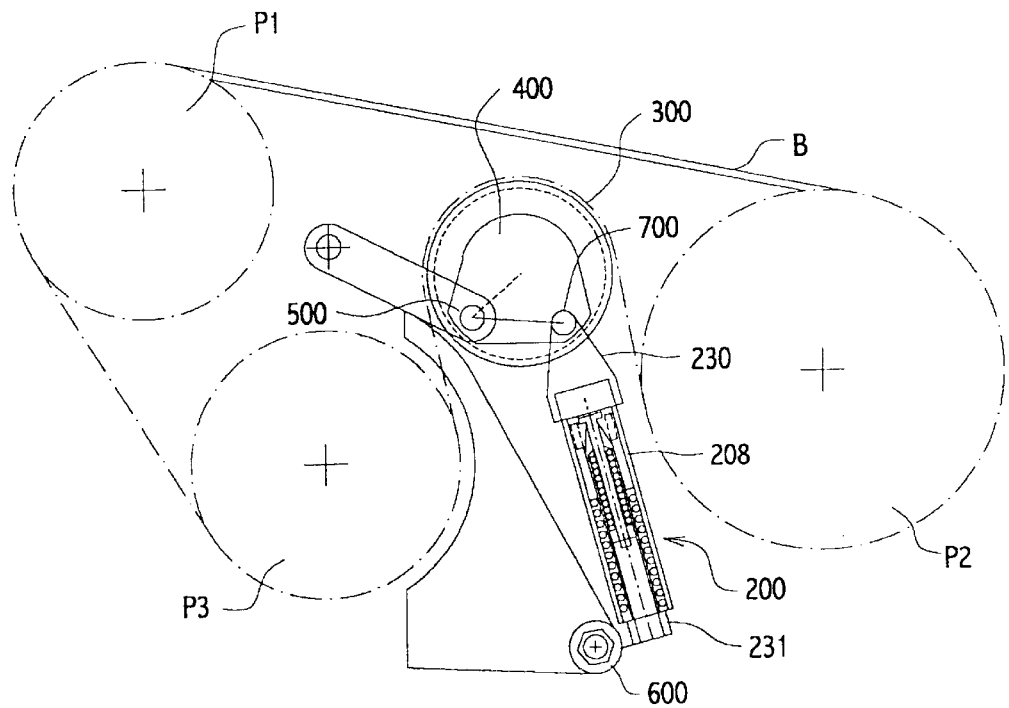
FIG.3
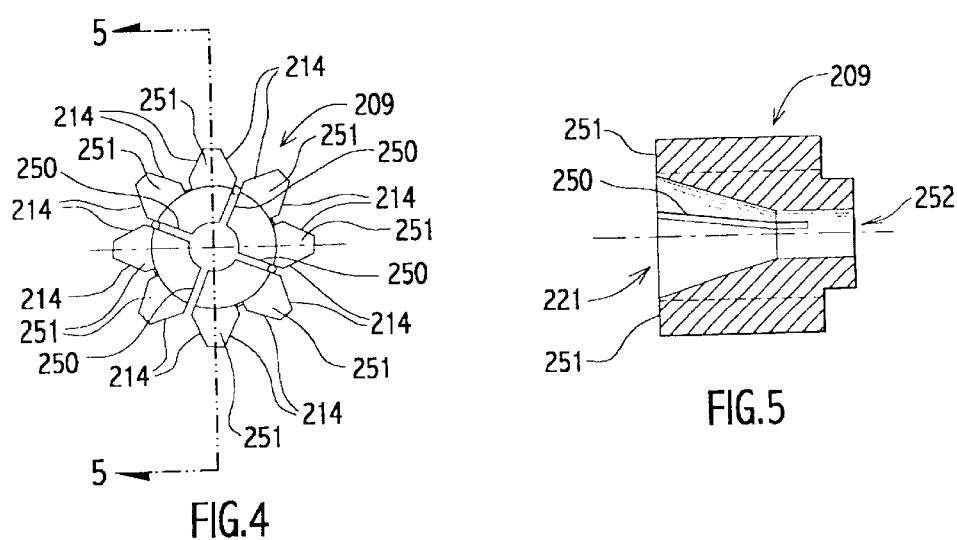
FIG.4
FIG.5

US 6,612,408 B2

FRICTIONAL DAMPING STRUT

FIELD OF THE INVENTION

The invention relates to struts, more particularly to frictional damping struts that are spring biased and have cooperating wedge members for damping a movement.

BACKGROUND OF THE INVENTION

Shock absorbers and struts and more particularly frictional damping struts are used to absorb and damp oscillatory movements in a number of applications. Applications include vehicles and machinery that are subject to repetitive oscillatory movements and vibration. Generally, a load is absorbed by a spring means while oscillations are absorbed and damped by viscous or frictional movement of cooperating parts.

Representative of the art is U.S. Pat. No. 2,429,140 (1947) to Snyder which discloses a shock absorber having a friction unit actuated by an expander.

Also representative of the art is U.S. Pat. No. 4,606,442 (1986) to Paton et al. which discloses an assembly comprising damper shoes that are guided by and wedged transversely between two wedge rings.

Frictional damping strut assemblies may be incorporated into a tensioner assembly. A tensioner may be used to preload an engine drive belt in order to maximize operational efficiency and to minimize noise and vibration during belt operation.

Representative of the art is U.S. Pat. No. 5,951,423 (1999) to Simpson which discloses a mechanical friction tensioner having spring loaded wedge-shaped blocks and friction damping. The tensioner has a wedge-shaped piston that interacts with spring biased wedge-shaped blocks. As the piston moves inward the wedge-shaped blocks are pushed outward to provide friction damping.

The prior art damping struts are relatively complex and do not afford asymmetric damping.

What is needed is a damping strut having cooperating simplified wedge members. What is needed is a damping strut having a simplified wedge member providing proportional frictional damping. What is needed is a damping strut providing asymmetric damping. What is needed is a tensioner having a damping strut having a simplified wedge member. The present invention meets these needs.

SUMMARY OF THE INVENTION

The primary aspect of the invention is to provide a damping strut having cooperating simplified wedge members.

Another aspect of the invention is to provide a damping strut having a simplified wedge member providing proportional frictional damping.

Another aspect of the invention is to provide a damping strut providing asymmetric damping.

Another aspect of the invention is to provide a tensioner having a damping strut having a simplified wedge member.

Other aspects of the invention will be pointed out or made obvious by the following description of the invention and the accompanying drawings.

The invention comprises a frictional damping strut. The strut comprises an inner cylinder that slides within an outer casing. A spring biases the inner cylinder away from the outer casing in an axial direction. A first wedge member cooperatively engages a second wedge member. The first wedge member having a frictional engagement with the inner cylinder such that when the inner cylinder is pressed into the outer casing the first wedge member bears upon the second wedge member causing the first wedge member to radially expand, thereby increasing a frictional force between the first wedge member and the inner cylinder. A second spring preloads the first wedge member against the second wedge member. A belt tensioner may incorporate the damping strut to preload a belt and damp belt oscillations.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 3 depicts a plan view of the inventive strut in use on a belt tensioner.

FIG. 4 is a plan view of the first wedge member.

FIG. 5 is a cross-sectional view of the first wedge member at 5—5 in FIG. 4.

DETAILED DESCRIPTION OF THE PREFERRED EMBODIMENT

Figure 1:
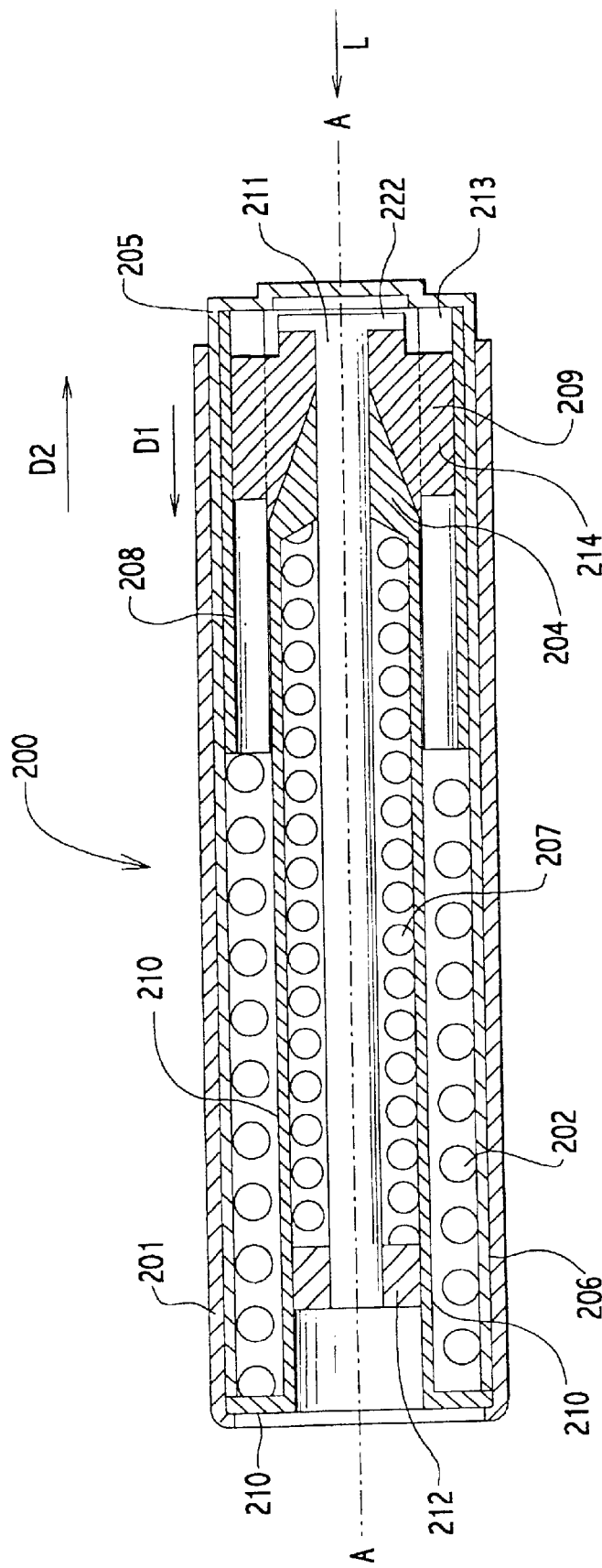
FIG. 1 is a cross-sectional view of the inventive strut.

FIG. 1 is a cross-sectional view of the inventive strut. Strut 200 comprises cylindrical outer casing 201. Liner 206 lines an inner surface of outer casing 201. Liner 206 has a predetermined coefficient of friction which may be varied to increase or decrease a frictional force. Inner cylinder 208 is slideably engaged with liner 206. Cylinder 208 moves longitudinally along axis A—A within liner 206 and thereby coaxially within outer casing 201.

Cylinder 208 bears upon first biasing member or spring 202 which urges cylinder 208 axially away from outer casing 201 along axis A—A. Spring 202 has a spring rate, k. Spring rate k is selected to assure proper operation based upon a load L imposed on the strut during operation.

Tube 210 is attached to and extends coaxially within outer casing 201, while having sufficient radial clearance to allow placement of spring 202 between tube 210 and liner 206. Second wedge member 204 is formed at an end of tube 210.

Second biasing member or spring 207 bears upon sliding member 212 and wedge member 204. Sliding member 212 is slidingly engaged with an inner surface of tube 210. Rod 211 is fixedly connected to sliding member 212 thereby constraining spring 207 between sliding member 212 and wedge member 204. Spring 207 compresses wedge member 209 between an end 222 of rod 211 and wedge member 204. Rod 211 is slidingly engaged with a bore through wedge member 204.

First wedge member 209 also comprises surface 214 which frictionally engages cooperating surface 213 in cylinder 208, see FIG. 4 and FIG. 5, each a detail of wedge member 209. The pleated form of surface 213 and 214 allows a greater normal force to act upon the area than would otherwise be possible based solely upon a cylindrical or tubular form for surface 213 and surface 214. A frictional force is a function of, among other things, a surface coefficient of friction, a surface area as well as a normal force acting upon the surface area. One may increase a frictional force by increasing a normal force. A normal force of the inventive strut is greater than that of a similarly sized prior art strut by virtue of the angled contact surface realized by a pleated form for surface 213 and 214. Surface 213 and 214 creates a greater frictional force and thereby greater damping force per spring 207 unit output, thereby providing an inventive strut having an increased damping capability in a smaller physical package. Wedge member 209 also comprises frustoconical hole 221. Wedge member 204 cooperatively engages hole 221.

In operation, in response to a load L, cap 205 and cylinder 208 move in direction D1. Movement of cylinder 208 into outer casing 201 in direction D1 is opposed by the biasing action of spring 202 as well as by the frictional engagement of surface 213 with surface 214. Such frictional engagement between surface 213 and surface 214 urges wedge member 209 into pressing engagement with wedge member 204. Due to the frustoconical shape of wedge member 204 when wedge member 209 is urged against wedge member 204 such action causes wedge member 209 to radially expand. Such expansion of wedge member 209 causes increased normal load on surface 213 and surface 214 and thereby an increased frictional force between surface 213 and surface 214. Increased frictional force causes increased resistance to movement of cylinder 208 in direction D1, thereby damping a movement of cylinder D1.

Movement of cylinder 208 in direction D2 results in a lesser frictional force being applied by wedge member 209 to cylinder 208. More particularly, wedge member 209 moves slightly in direction D2 which lessens the force on wedge member 204. However, wedge member 209 experiences resistance to further movement in direction D2 because spring 207 is operating on member 212 which is connected to rod 212 which, in turn, restrains a further movement of wedge member 209. This has the effect of reducing the normal force on surface 213 which reduces the frictional force between surface 213 and surface 214. Consequently, movement of cylinder 208 in direction D1 is asymmetric with respect to a movement in direction D2 because in direction D2 it is subject to a reduced frictional, and thereby damping, force as compared to direction D1.

Figure 2:
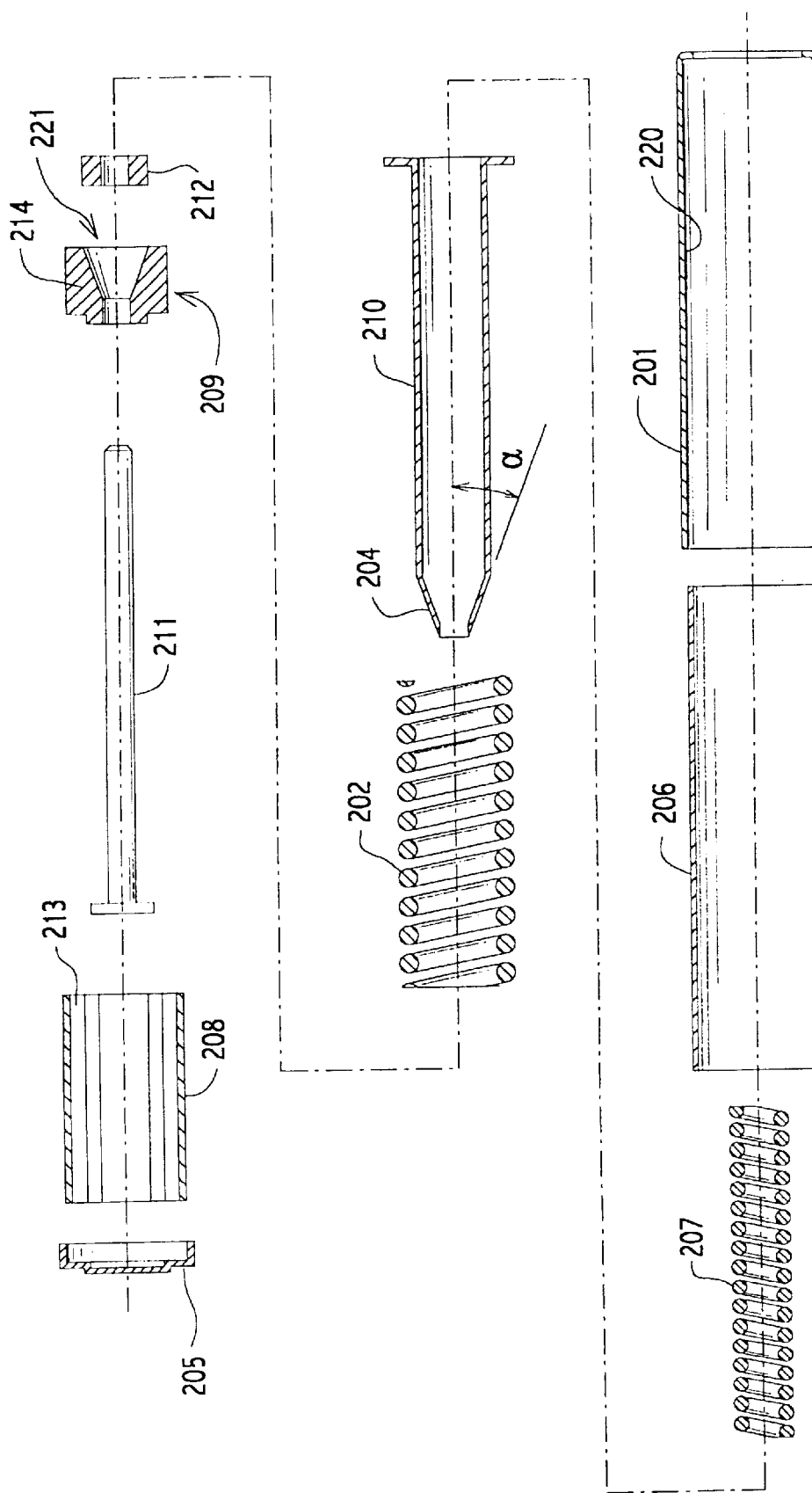
FIG. 2 is a cross-sectional exploded view of the inventive strut.

FIG. 2 is a cross-sectional exploded view of the inventive strut. Sliding member 212 is press fit onto or otherwise attached to an end of rod 211. Spring 207 is constrained between sliding member 212 and wedge member 204. A force exerted by spring 207 presses wedge member 204 against an inner frustoconical surface of wedge member 209. Wedge member 204 describes an angle α with respect to an axis A—A.

Liner 206 engages an inner surface 220 of outer casing 201. A damping rate of the strut may be adjusted by changing a spring rate K of spring 207. Increasing a spring rate increases the normal force exerted by wedge member 204 upon wedge member 209, thereby increasing a damping coefficient. The converse is also true, i.e., decreasing a spring rate decreases a normal force exerted by wedge member 204 upon wedge member 209, thereby decreasing a damping coefficient. One can also appreciate that the normal force can be adjusted by changed the angle α, which will directly affect a damping rate. Changing angle α will change the extent to which wedge member 209 is expanded against cylinder 208.

One skilled in the art can appreciate that a spring rate for spring 202 determines the magnitude of a load L that can be borne by the strut. That is, the magnitude of L for an appropriate application will increase or decrease with a like change in a spring rate for spring 202.

FIG. 3 depicts a plan view of the inventive strut in use on a belt tensioner. Strut 200 is pivotably connected to an engine block at pivot 600 by fitment 231 which is connected to outer casing 201. The other end of strut 200 comprises connector 230, which is attached to cylinder 208. Connector 230 is pivotably attached to a pulley base 400 at pivot 700. A pulley 300 is rotationally attached to base 400. Base 400 is pivotably connected to an engine block at pivot 500. Belt B is trained between pulleys P1, P2, and P3 on an engine front end accessory drive system. The tensioner maintains a proper predetermined tension in the belt in order to prevent belt noise and slipping. As described elsewhere in this specification, a belt tension and in turn strut load is a function of a spring rate for spring 202. A higher spring rate allows a greater load to be borne by the strut and tensioner.

FIG. 4 is a plan view of the first wedge member. Wedge member 209 comprises protrusions 251 extending radially in a star pattern, although any plan form is acceptable for the purposes of the invention so long as surface 213 and surface 214 have cooperating shapes. Surfaces 214 of protrusions 251 engage cooperating surfaces 213 (not shown). Slots 250 extend partially axially through the member. Slots 250 allow member 209 to partially expand radially outward when a pressure is applied by second wedge member 204.

FIG. 5 is a cross-sectional view of the first wedge member at line 5—5 in FIG. 4. Slot 250 is shown extending partially axially through member 209. Rod 211 extends through hole 252.

Although a single form of the invention has been described herein, it will be obvious to those skilled in the art that variations may be made in the construction and relation of parts without departing from the spirit and scope of the invention described herein.

We claim:

1. A strut comprising:
   a first member;
   a second member coaxially engaged with the first member;
   a biasing member engaged between the first member and the second member;
   a first wedge member having an axis and slidingly engaged with the second member;
   the first wedge member having a frustoconical hole;
   a second wedge member connected to the first member and having an axis;
   the second wedge member cooperatively engaging the frustoconical hole;
   a second biasing member having a first end immovably fixed;
   a member attached to the first wedge member and engaging a second end of the second biasing member whereby a movement of the first wedge member is acted upon by the second biasing member acting upon the member;
   a rod slidingly extending through a bore in the second wedge member whereby the second biasing member is oppositely placed from the first wedge member relative to the second wedge member;
   the second wedge member axially engaged with the first wedge member; and
   the first wedge member being expandable in response to a pressure from the second wedge member.

2. The strut as in claim 1, wherein:
   the first wedge member further comprises an outer frictional surface having a pleated form; and
   the second member having an inner surface having a pleated form for cooperatively engaging the first wedge member outer frictional surface.

3. The strut as in claim 1, wherein:

the first wedge member outer frictional surface and the second member inner surface each having a coefficient of friction.

4. The strut as in claim 1 in combination with:

a base pivotally mountable to a surface;

a pulley having a belt bearing surface, the pulley rotationally mounted to the base; and a first end of the strut pivotally mounted to the base and a second end of the strut pivotally mountable to a surface.

5. A strut comprising:

a first cylinder and a second cylinder axially engaged;

a first biasing member engaged with the first cylinder and the second cylinder;

a first wedge member frictionally engaged with a surface of the second cylinder, the first wedge movable with respect to the second cylinder;

a second wedge fixed relative to the first cylinder and engageable with the first wedge, the first wedge expandable upon a movement of the first wedge against the second wedge, thereby increasing a frictional force between the first wedge member and the second cylinder;

the first wedge member describing a frustoconical hole and the second wedge member cooperatively engaging the frustoconical hole;

a second biasing member engaged with the first wedge member whereby a first movement of the first wedge member is resisted as a pressure between the first we&re member and the second wedge member is diminished;

a second movement of the first wedge member is assisted by the second biasing member as a pressure between the first wedge member and the second wedge member is increased;

a member attached to the first wedge member and engaging a second end of the second biasing member whereby a movement of the first wedge member is acted upon by the second biasing member acting upon the member; and a rod slidingly extending through a bore in the second wedge member whereby the second biasing member is oppositely placed from the first wedge member relative to the second wedge member.

6. The strut as in claim 5, wherein an outer surface of the first wedge member describes a pleated form.

7. The strut as in claim 5 in combination with:

a base pivotally mountable to a surface;

a pulley having a belt bearing surface, the pulley rotationally mounted to the base; and a first end of the strut pivotally mounted to the base and a second end of the strut pivotally mountable to a surface.

* * * * *